June 3, 1947.    G. W. ROSE    2,421,716
MACHINE WORK TABLE HAVING MAGNETIC CLAMP MEANS
Filed Feb. 8, 1944
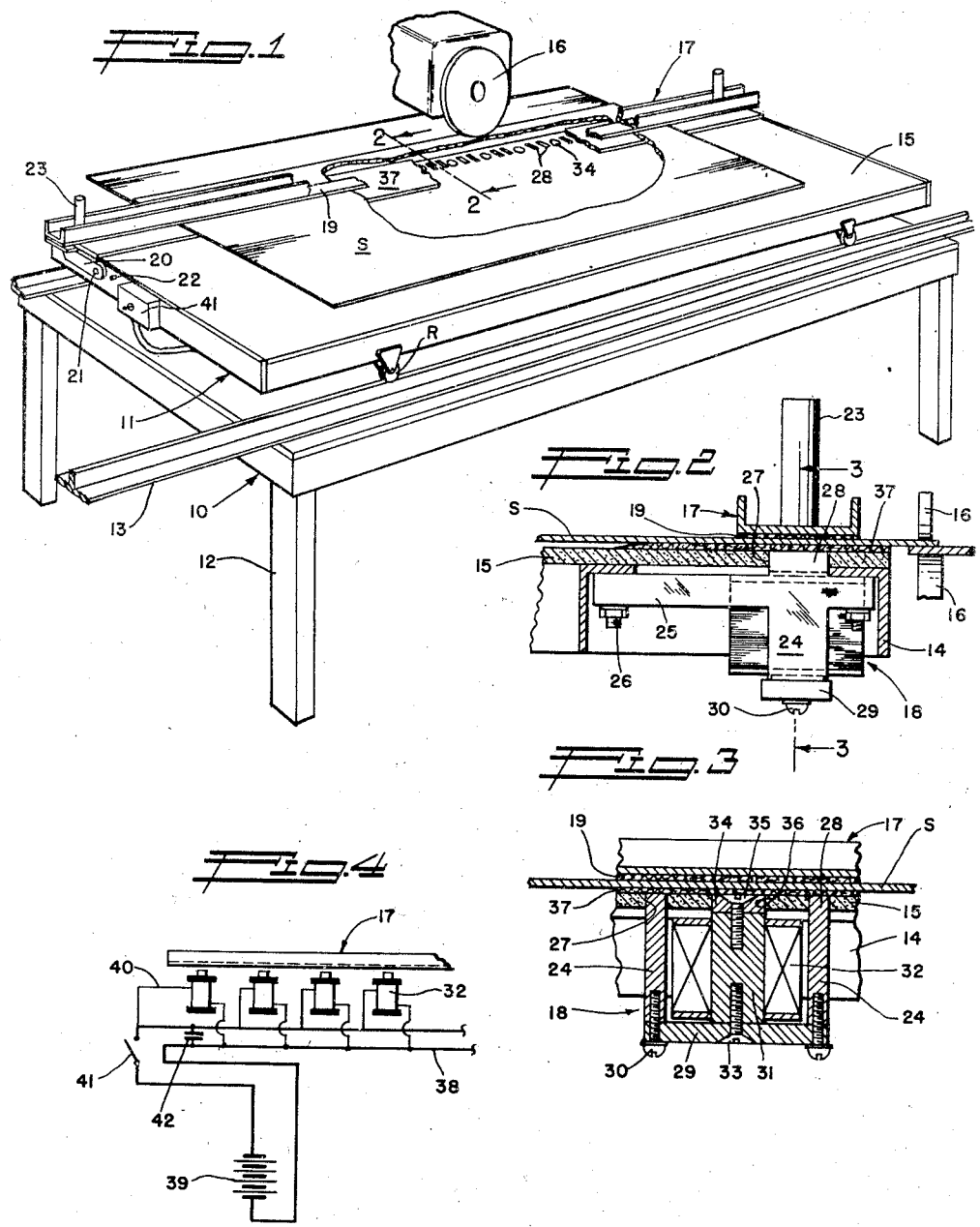
Inventor
GEORGE W. ROSE
By George C. Sullivan
Agent Patented June 3, 1947

2,421,716

UNITED STATES PATENT OFFICE 2,421,716

MACHINE WORKTABLE HAVING MAGNETIC CLAMP MEANS

George W. Rose, Los Angeles, Calif., assignor to Lockheed Aircraft Corporation, Burbank, Calif.

Application February 8, 1944, Serial No. 521,530

4 Claims. (Cl. 219—4)

This invention relates to clamping devices and relates more particularly to means for clamping work sheets, plates, and the like, on work tables, machines, jigs, etc.

In many present day production and fabrication procedures it is necessary to securely hold sheets, plates and other work pieces in a definite position while being worked upon. In some instances it is required that sheets or work pieces of substantial length be uniformly clamped in place. For example, in a roll welding machine, the sheets being welded together must be securely clamped to the table and dependably held against movement adjacent to the line of action of the welding rolls. In such instances it has been the general practice to employ mechanical clamps such as C clamps or toggle clamps arranged individually or in gangs. Conventional mechanical clamps are heavy and cumbersome and do not provide a uniform clamping action throughout the lengths of the sheets even when employed in gangs. The mechanical clamps must be manually adjusted and operated and where the sheets must be accurately located for the welding operations it is a tedious and time-consuming operation to manipulate the clamps while adjusting and locating the sheets. Furthermore, the mechanical clamps form obstructions or hazards which interfere with the operations.

It is a general object of this invention to provide a simple, light weight and easily operated means for securely and uniformly clamping sheets and other work pieces on to tables, machines, jigs, and other work surfaces.

Another object of the invention is to provide a magnetic clamp means which is operable to clamp paramagnetic as well as non-magnetic sheets, plates, etc., onto the surface of the table or machine.

Another object of the invention is to provide a magnetic clamp means that exerts a uniformly distributed clamping pressure, in a limited strip area, throughout the length of the work or table without distorting the work. The uniform pressure exerted by the clamp insures flat engagement of the work with the work surface or table and eliminates all possibility of work distortion.

Another object of the invention is to provide a magnetic clamp means of the character referred to that presents a minimum of obstructions at the working surface and does not interfere with the placement or the removal of the work sheets. The sheets may be readily placed on the table and shifted to the required positions without interference of the clamp parts, and when the machine is in operation the clamp cannot interfere with the welding operations.

A further object of the invention is to provide a magnetic clamp means that is much lighter in weight than the clamping devices heretofore employed. Where the table is intermittently advanced as in a roll welding machine, it is of prime importance to make the table and its associated parts as light in weight as possible to hold the inertia at a minimum. The clamp device of the invention may be very light in weight so that it does not materially increase the inertia effects during intermittent movement of the table.

Other objects and features of the invention will be readily understood from the following detailed description of a typical preferred form of the invention in which reference will be made to the accompanying drawings in which, Figure 1 is a perspective view of a portion of a roll welding machine embodying the clamp means of the invention with certain portions broken away to better illustrate the invention;

Figure 2 is an enlarged fragmentary vertical detailed sectional view taken as indicated by line 2—2 on Figure 1;

Figure 3 is a fragmentary vertical detailed sectional view taken as indicated by line 3—3 on Figure 2; and, Figure 4 is a wiring diagram illustrating a portion of the circuit embodied in the clamping means.

The clamping device of the invention has many applications and may be varied in construction to adapt it for use in different situations. It may be employed with work of practically any kind and may be utilized to clamp or secure work pieces of different proportions, configurations and materials. In the present disclosure the invention will be described as embodied in a roll welding machine having a work table that is intermittently advanced during the welding operation. It is to be understood that the invention is not to be construed as limited to this particular embodiment or application, but is to be taken as including any features or modifications that fall within the scope of the claims.

The portion of the welding machine illustrated includes a base or supporting structure 10 and a carriage or table 11 movable horizontally along the top of the structure 10. The structure 10 is an elongate rectangular unit having suitable supporting legs 12. Spaced longitudinal rails 13 are secured to the top of the structure 10 and the table 11 has wheels or rollers R which operate on the rails 13. The rollers R mount the table 11 for free horizontal movement in the longitudinal direction. The table 11 comprises a rectangular frame formed of angle members 14, or the equivalent, and a table top 15 secured to the frame to present a work surface. Where the work pieces are formed of relatively soft material and easily scratched, the table top 15 is preferably formed of plastic, wood or pressed fibrous material so that the work pieces will not be scratched or marred while being handled on the table. The machine further includes the welding rolls 16 of copper, or the like, for engaging the upper and lower work sheets S adjacent the forward edge of the table 11. The rolls 16 are intermittently rotated to advance the table 11 and the work as the successive welds are made. Where the table 11 is advanced by the rolls 16, through the medium of the work sheet S, there is a tendency for the sheets to become displaced and it is essential that the sheets be securely clamped to the table.

The clamp means of the invention comprises a bar or clamping member 17 for engaging downwardly against the work and electromagnetic means 18 for urging the member 17 against the work.

In accordance with the broader aspects of the invention, the clamping member 17 may be of any required length and width and may be of any selected cross sectional shape. In practice the member 17 may extend throughout the entire length of the table 11 as illustrated in Figure 1 so that it is adapted to engage any work sheets that may be placed on the table. The clamping member 17 is formed to have uniform engagement with the work pieces throughout its length. I have shown the clamping member 17 formed of channel stock and arranged so that its broad face is directed downwardly toward the work sheets S. The active face of the clamping member 17 may be covered with a facing 19 of rubber, leather, fabric, or a combination of such materials so that the member cannot scratch or mar the soft work sheets such as sheets of aluminum alloy.

Where the invention is embodied in a welding machine of the character illustrated, it is preferred to pivot or hinge the clamp member 17 to the table 11 so that it may be readily swung between a raised inactive position and an active clamping position. In other instances the member 17 may be normally disconnected from the table 11 so that it may be arranged in any required position on the work so long as it is within the range or field of the electromagnetic means 18. The embodiment of the invention illustrated includes hinges 20 secured to the opposite end portions of the member 17 and pivotally attached to the ends of the table 11 at 21. The hinges 20 are such that the clamp member 17 may be moved from a raised position to an active clamping position where it engages with the work along the forward edge portion of the table 11. Stops 22 may be provided on the ends of the table 11 in positions to be engaged by the hinges 20 to support the member 17 in its raised idle position. Upstanding handles 23 may be provided on the member 17 adjacent its ends to facilitate the manual operation or positioning of the member. The clamping member 17 is formed of iron, steel or other ferromagnetic material to be acted upon or attracted by the means 18.

The electromagnetic means 18 is carried by the movable table 11 and is operable to establish a multiplicity of magnetic fields which attract the member 17 and draw it downwardly to clamp the work sheets onto the table 11. The means 18 includes a plurality of electromagnetic units arranged at the under side of the table top 15. In the construction illustrated, the units are arranged in a single row or series which extends longitudinally of the table top adjacent its forward edge to be directly below and parallel with the member 17, assuming the member to be in its active clamping position. It is to be understood that there may be parallel adjacent rows of electromagnetic units and in some instances the units may be arranged in pairs or in isolated relation. The several electromagnetic units may be identical and I will proceed with a description of one of them, it being understood that such description is equally applicable to the other units.

Each unit includes a pair of vertically disposed side plates 24. The side plates 24 may have arms 25 projecting forwardly and rearwardly to spaced angle members 14 of the table frame and these arms may be secured to the angle members by studs and nuts 26. The upper portions of the plates 24 are received in openings or slots 27 in the table top 15 and constitute pole pieces or poles 28. The side plates 24 are formed of iron, or the like, to have a high magnetic permeability. The upper ends of the poles 28 are flat and horizontal, and are flush with the table top 15. A bottom plate 29 is attached to the lower ends of the side plates 24 by screws 30. The bottom plate 29 is formed of iron, or the like. The side plates 24 and the bottom plate 29 form an efficient path for the magnetic flux as will be later described.

The electromagnetic unit further includes a vertical core 31 secured to the bottom plate 29 and an electromagnetic coil 32 surrounding the core. A suitable screw 33 may serve to attach the core to the bottom plate 29. A pole cover 34 is attached to the upper end of the core 31 by a screw 35 and is received in an opening 36 spaced mid-way between the openings 27. The upper end of the tip or cover 34 is preferably flush with the upper surface of the table top 15. The cover 34 is formed of iron or other material having a high permeability. It may be preferred or necessary to secure a strip 37 of leather, fabric, or the like, to the upper surface of the table top 15 to cover the poles 28 and core tip 34 to prevent these parts from scratching or marring the work sheets.

As illustrated in Figure 1, the poles 28 of the adjacent electromagnetic units may be in close spaced relation so that there is a multitude of adjacent magnetic fields for acting upon the clamp member 17. Where the construction of the table 11 permits, the electromagnetic units may be equally spaced to insure a perfectly uniform clamping pressure. The series of electromagnetic units may extend throughout the entire length of the table 11 so that substantially the entire length of the clamping member 17 will be influenced by the magnetic fields.

The means for energizing the coils 32 of the electromagnetic units may comprise a pair of buses or conductors 38. A suitable source 39 of electrical energy is interposed in one of the conductors 38. Pairs of taps 40 extend from the terminals of the coils 32 to the two leads 38 so that the series of coils is connected in parallel. A switch 41 is provided in one of the main leads 38 to provide for energization and de-energization of the series of coils 32. The switch 41 is arranged for convenient operation. For example, it may be secured to an end of the table 11. A condenser 42 may be connected between the main leads 38 behind the switch 41 to be bled off by the coils 32 when the switch is operated.

In using the machine, the clamp member 17 is raised to its idle position to leave the face of the table 11 free and clear. The work sheets S are then positioned on the table. The sheets S are usually arranged so that they have overlapping edge portions adjacent the forward edge of the table 11 as illustrated in Figure 2. Considerable care is taken in properly aligning and positioning the sheets S to insure the production of a good straight lapped joint. It is to be observed that the sheets S may be freely shifted about without interference by the clamp means and it is not necessary to handle any clamping fixtures while locating the sheets S. When the sheets have been brought to their correct positions the clamping member 17 is swung down to the position illustrated in the drawings. The switch 41 is then closed to energize the coils 32. The lowering of the member 17 and the closing of the switch 41 are the only manual acts required in clamping the work onto the table 11.

When the coils 32 are energized they set up magnetic fields which attract the member 17. The magnetic fields draw the clamp member 17 downwardly with considerable force so that the work is securely clamped between the member and the table top 15. By reason of the uniform configuration of the member 17 and the close relationship of the electromagnetic units, the work is clamped or secured with a uniform pressure throughout its length. The magnetic flux of each coil 32 is carried by the bottom plate 29 to the side plates 24 and passes upwardly through the side plates to the poles 28. This flux path is very efficient and there is a minimum of dissipated or stray magnetic flux. The magnetic flux is concentrated at the pole pieces 28 which are as close as possible to the under side of the clamping member 17. The magnetic flux flows between the poles 28 and the core tip 34, passing through the clamping member 17. It will be observed that each electromagnet unit establishes a highly efficient magnetic field through the member 17. The electromagnetic means acting through the medium of the member 17 securely holds the work sheets S during the welding operation. When the operation is completed the switch 41 is opened to de-energize the coils 32. The clamping member 17 is then raised to its idle position and the sheets S are free to be advanced or withdrawn from the table.

Having described only a typical form of the invention, I do not wish to be limited to the specific detail herein set forth, but wish to reserve to myself any variations or modifications that may appear to those skilled in the art or fall within the scope of the following claims.

I claim:

1. In a machine of the character described, a table supported for movement and adapted to carry a work piece, means for acting on the work piece along a given elongate zone thereof to move the table, and means for releasably clamping the workpiece to the table comprising hinge means carried by the table, a ferro magnetic clamp member attached to the table by said hinge means for engaging downwardly against the work piece adjacent and parallel to said zone thereof and electromagnetic means on the under side of the table for attracting the clamp member downwardly to clamp the work piece to the table.

2. In a machine of the character described, a table supported for translatory movement and adapted to carry a work piece, means for acting on an edge portion of the work piece to move the table and work piece as a unit, and means for releasably clamping the work piece to the table comprising hinge means carried by the table, an elongate ferro magnetic clamp member attached to the table by said hinge means for engaging downwardly against the upper side of said edge portion of the work piece in substantially parallel relation to the edge of the work piece, and a row of electromagnets on the under side of the table in substantially the same vertical plane as the clamp member for establishing magnetic fields to attract the member downwardly so that it clamps the work piece onto the table.

3. In a machine of the character described, a table supported for translatory movement and adapted to carry a work piece, means for acting on an edge portion of the work piece to move the table and work piece as a unit, and means for releasably clamping the work piece to the table comprising hinge means carried by the table, a ferro magnetic clamp member attached to the table by said hinge means for engaging downwardly against the upper side of said edge portion of the work piece, and a row of electromagnets on the under side of the table parallel to and adjacent said edge portion of the work piece for establishing magnetic fields to attract the member downwardly so that it clamps the work piece onto the table, each electromagnet comprising a core extending upwardly to the surface of the table and pole pieces extending from the lower end of the core to the surface of the table at opposite sides of core.

4. In a machine of the character described, an elongate table for supporting a work piece, means supporting the table for axial movement, means for acting on the work piece adjacent a longitudinal margin of the table to move the table and work piece in the axial direction, a clamp member of paramagnetic material extending longitudinally over the table in spaced adjacent relation to said margin of the table, hinge means on opposite ends of the table supporting said member for movement between a raised position where the work piece may be freely engaged on and removed from the table and a lowered position in engagement with a work piece on the table, and a row of electromagnets at the under side of the table, said row extending in adjacent parallel relation to said margin of the table to be directly below said member when the same is in said lowered position and operable when energized to attract said member so that the member clamps the work piece onto the table.

GEORGE W. ROSE.

REFERENCES CITED

The following references are of record in the file of this patent:

UNITED STATES PATENTS

| Number | Name | Date |
| --- | --- | --- |
| 1,045,911 | Thomson | Dec. 3, 1912 |
| 1,965,521 | Cutter | July 3, 1934 |
| 2,347,185 | Fentress | Apr. 25, 1944 |
| 2,095,295 | Smith et al. | Oct. 12, 1937 |
| 1,637,031 | Tobey | July 26, 1927 |

FOREIGN PATENTS

| Number | Country | Date |
| --- | --- | --- |
| 375,238 | Germany | May 9, 1923 |